(12) United States Patent
Chauvin et al.

(10) Patent No.: US 10,041,473 B2
(45) Date of Patent: Aug. 7, 2018

(54) METHOD OF OPTIMIZING THE POWER RECOVERED BY A WIND TURBINE BY REDUCING THE MECHANICAL IMPACT ON THE STRUCTURE

(75) Inventors: Jonathan Chauvin, Paris (FR); Yann Creff, Les Cotes D'Arey (FR)

(73) Assignee: IFP ENERGIES NOUVELLES, Rueil-Malmaison (FR)

(*) Notice: Subject to any disclaimer, the term of this patent is extended or adjusted under 35 U.S.C. 154(b) by 751 days.

(21) Appl. No.: 13/491,686

(22) Filed: Jun. 8, 2012

(65) Prior Publication Data

US 2012/0321463 A1 Dec. 20, 2012

(30) Foreign Application Priority Data

Jun. 17, 2011 (FR) ...................................... 11/01879

(51) Int. Cl.
*F03D 7/04* (2006.01)
*F03D 7/02* (2006.01)

(52) U.S. Cl.
CPC .......... *F03D 7/0224* (2013.01); *F03D 7/0292* (2013.01); *F03D 7/045* (2013.01); *Y02E 10/723* (2013.01)

(58) Field of Classification Search
CPC ...... F03D 7/0224; F03D 7/028; F03D 7/0292; F03D 7/0296; F03D 7/042; F03D 7/045; F05B 2260/70; F05B 2260/71; F05B 2260/78; F05B 2260/96; F05B 2260/966; F05B 2270/1033; F05B 2270/20; F05B 2270/32; F05B 2270/328; F05B 2270/331; F05B 2270/335; F05B 2270/402; F05B 2270/701

(Continued)

(56) References Cited

U.S. PATENT DOCUMENTS

| 2006/0033338 A1 | 2/2006 | Wilson |
| 2009/0263245 A1 | 10/2009 | Shi et al. |
| 2010/0014969 A1 | 1/2010 | Wilson et al. |

FOREIGN PATENT DOCUMENTS

| EP | 2 112 376 A2 | 10/2009 |
| WO | WO 2008/041066 A1 | 4/2008 |
| WO | WO 2010/016764 A1 | 2/2010 |

OTHER PUBLICATIONS

Bossanyi, E. A.: "The Design of Closed Loop Controllers for Wind Turbines", Wind Energy, John Wiley & Sons, vol. 3, No. 3, Jan. 1, 2000 (Jan. 1, 2000), pp. 149-163, XP007908706, ISSN: 1095-4244, DOI: 10.1002/WE.34.

(Continued)

*Primary Examiner* — Jason Shanske
*Assistant Examiner* — Alexander White
(74) *Attorney, Agent, or Firm* — Fitch, Even, Tabin & Flannery LLP

(57) ABSTRACT

A method of optimizing the power recovered by a wind turbine by reducing the mechanical impact on the structure is disclosed. A first angle of inclination of the blades allowing the recovered power to be optimized is determined. The aerodynamic force produced on the nacelle when the blades are directed with a first angle is determined. A second angle of inclination of the blades allowing obtaining an aerodynamic force setpoint value is then determined by inverting the aerodynamic force model and using a wind velocity measurement, a rotor velocity measurement and the aerodynamic force setpoint value. Finally, the blades are directed to the second angle.

17 Claims, 5 Drawing Sheets

(58) Field of Classification Search
USPC ............... 416/27, 31, 36, 37, 40, 41, 43, 61; 415/26, 30
See application file for complete search history.

(56) References Cited

OTHER PUBLICATIONS

Petrovic, Vlaho et al: "Identification of Wind Turbine Model for Individual Pitch Controller Design", Universities Power Engineering Conference, 2008. UPEC 2008. 43rd International, IEEE, Piscataway, NJ, USA, Sep. 1, 2008 (Sep. 1, 2008), pp. 1-5, SP031349098 ) ISBN: 978-4244-3294-3.

METHOD OF OPTIMIZING THE POWER RECOVERED BY A WIND TURBINE BY REDUCING THE MECHANICAL IMPACT ON THE STRUCTURE

CROSS-REFERENCE TO RELATED APPLICATIONS

Reference is made to French Patent Application Serial No. 11/01.879, filed on Jun. 17, 2011, which application is incorporated herein by reference in its entirety.

BACKGROUND OF THE INVENTION

Field of the Invention

The present invention relates to renewable energy and more particularly to the control of wind turbines.

A wind turbine allows the kinetic energy from the wind to be converted into electrical or mechanical energy. It is made up of the following elements:
- a tower allowing positioning of the rotor at a sufficient height to allow motion thereof (necessary for horizontal-axis wind turbines) or positioning the rotor at a height enabling it to be driven by a stronger and more regular wind than at ground level wherein the tower generally houses part of the electrical and electronic components (modulator, control, multiplier, generator, etc.);
- a nacelle mounted at the top of the tower, housing the mechanical, pneumatic components, and electrical and electronic components necessary to operate the machine. The nacelle can rotate so as to adjust the machine to the right direction; and
- a rotor having blades (generally three) and of the nose of the wind turbine, fastened to the nacelle with the rotor being driven by wind power and it is connected by a mechanical shaft, directly or indirectly (via a gearbox and mechanical shaft system) to the electrical machine (electrical generator) that converts the energy recovered to electrical energy.

In the case of offshore wind power, a distinction is made between the case where the wind turbine is set on the sea bottom (bottom-mounted wind turbine) and the case where the wind turbine is supported by a platform that floats on the sea and is anchored to the bottom (floating wind turbine).

Increasing wind power production requires developing effective production tools and advanced control tools to improve the performance of the machines. Wind turbines are designed to produce electricity at the lowest possible cost. Wind turbines are therefore generally built so as to reach their maximum performance at approximately 15 m/s. It is in fact useless to design wind turbines that maximize their yield at even higher wind velocities, which are not common. In case of wind velocities above 15 m/s, it is necessary to lose part of the additional energy contained in the wind to avoid damaged wind turbines. All wind turbines therefore have a power regulation system.

Linear controllers have been widely used for power regulation by controlling the angle of inclination of the blades (blade orientation). There are known techniques using PI and PID controllers, LQ and LQG control techniques, strategies based on robust linear controls.

However, the performance of linear controllers is limited by the highly non-linear characteristics of the wind turbine. First strategies based on non-linear controls have been used in: Boukhezzar B., Lupu L., Siguerdidjane H., Hand M. "*Multivariable Control Srategy for Variable Speed, Variable Pitch Wind Turbines*" Renewable Energy, 32 (2007) 1273-1287.

None of these controllers however allows the mechanical impact on the structure (fatigue and extreme moment) to be taken into account.

SUMMARY OF THE INVENTION

The invention is a method for optimizing the electrical power production of a horizontal-axis wind turbine using non-linear control of the orientation of the blades by accounting for the system dynamics, while minimizing the mechanical impact on the structure. The impact is minimized by modifying the angle of inclination of the blades so that the aerodynamic force applied to the nacelle leads to a zero velocity at the top of the tower. The method notably is based upon a physical model of the aerodynamic force.

In general terms, the invention is a method for optimizing the electrical power production of a horizontal-axis wind turbine, comprising a tower supporting a nacelle provided with a rotor to which blades are fastened, wherein an angle of inclination of the blades is controlled. The method comprises:

a) determining a first angle of inclination of the blades allowing recovered power to be optimized;

b) selecting an aerodynamic force model representing an aerodynamic force produced on the nacelle as a function of a wind velocity, an angle of inclination and rotor velocity;

c) determining the aerodynamic force produced on the nacelle when the blades are directed to the first angle;

d) determining a setpoint value of the aerodynamic force produced on the nacelle when the blades are directed with first angle, by decreasing the aerodynamic force determined in c) by a term which decreases velocity variations at a top of the tower;

e) determining a second angle of inclination of the blades allowing obtaining the set point value of the aerodynamic force by inverting the aerodynamic force model utilizing a wind velocity measurement, a rotor velocity measurement and the set point value of the aerodynamic force; and f) directing the blades to the second angle.

According to the invention, the term is defined to decrease velocity variations at the top of the tower in proportion to a difference between current tower position and velocity values and reference tower position and velocity values with a reference position value depending on the aerodynamic force determined in c), and a zero reference velocity value.

According to the invention, the model of aerodynamic force is a function of the wind velocity $V_w$, of the angle of inclination $\theta$ and of the rotor velocity $\Omega_r$ which is written as an equation as follows:

$$F_{aero} = 0.5 \rho \Pi R_b^2 c_t \left(\theta, \frac{R_b \Omega_r}{V_w}\right) V_w^2$$

with:
$R_b$: rotor radius;
$\rho$: air density;
$c_t$: mapping parameter.

A term proportional to the tower torsion can be added to the term corresponding to the wind velocity of the aerodynamic force model.

According to the invention, the first angle of inclination of the blades allowing the recovered power to be optimized can be determined by carrying out the following:

a) selecting an aerodynamic force model representing the aerodynamic torque produced on the nacelle as a function of a wind velocity $V_w$, of the angle of inclination and of a rotor velocity $\Omega_r$;

b) using the model to determine an aerodynamic torque setpoint value;

c) determining the first angle of inclination of the blades allowing obtaining the setpoint value of the aerodynamic torque by inverting the aerodynamic torque model while using a wind velocity measurement, a rotor velocity measurement and the setpoint value of the aerodynamic torque.

The aerodynamic torque model can be written as an equation as follows:

$$T_{aero} = 0.5 \rho \Pi R_b^3 c_q\left(\theta, \frac{R_b \Omega_r}{V_w}\right) V_w^2$$

with:
$R_b$ being rotor radius;
$\rho$ being air density;
$c_q$ being mapping parameter.

A term proportional to the tower torsion can be added to the term corresponding to the wind velocity of the model representing aerodynamic torque.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

Figure 1:
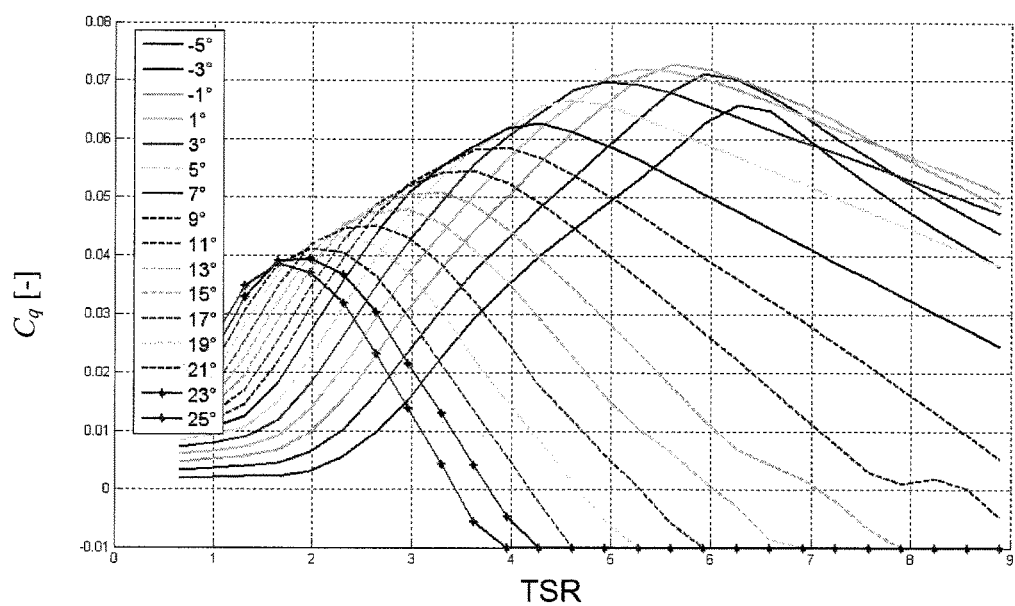
FIG. 1 illustrates a parameter $c_q$ mapping example.

The following notations are used in the description:
Controlled Variables:
$\theta$ is the angle of inclination of the blades in degrees (also referred to as pitch)
$T_e$ is the torque of the electric machine in Nm.
Measured Variables, Denoted MES(-):
$V_w$ is the wind velocity in m/s. This velocity results from a measurement from an anemometer or from an estimation,
$\Omega_r$ is the rotor velocity in rad/s,
$T_{aero}$ is the aerodynamic torque (rotational effort applied onto the rotor under the effect of the wind),
$x_t$ is the displacement of the tower from its equilibrium position. This position corresponds to the horizontal displacement of the top of the tower, in meters, from its equilibrium position in the absence of wind and waves,
$x_p$ is the displacement of the platform from its equilibrium position. This position corresponds to the displacement of the connection point between the platform and the tower, in meters, from its equilibrium position in the absence of wind and waves. If considering only the onshore case, this variable is assumed to be constant and equal to 0.

The method according to the invention for optimizing the electrical power production of a wind turbine comprises the following stages:

1) determining a first angle of inclination of the blades allowing recovered electrical power and a recovery torque of the electrical machine to be maximized;

2) selecting an aerodynamic force model representing the aerodynamic force produced on the nacelle as a function of wind velocity $V_w$, of the angle of inclination and of rotor velocity $\Omega_r$;

3) determining the aerodynamic force produced on the nacelle when the blades are directed with this first angle;

4) determining a setpoint value for the aerodynamic force produced on the nacelle when the blades are directed with the first angle, by decreasing the aerodynamic force determined in step c by a term which decreases velocity variations of the tower;

5) determining a second angle of inclination of the blades allowing obtaining the set point value of aerodynamic force by inverting the aerodynamic force model using a value of measured wind velocity, a rotor velocity measurement and the set point value of aerodynamic force; and 6) directing the blades to the second angle.

1—Determining the Pitch Allowing the Recovered Power to be Maximized

One objective of the method according to the invention is to maximize the energy production of a horizontal-axis wind turbine (propeller perpendicular to the wind), located onshore or offshore, while limiting extreme moments and fatigue of the mechanical structure.

Maximizing the energy production of a wind turbine during wind variation requires finding the angle of inclination or pitch of the blades, denoted $\theta$, allowing maximizing the recovered power $P_{aero}$ as a function of wind velocity $V_w$. The orientation of the blades is the angle between the blades and a reference such as the ground (horizontal plane, perpendicular to the tower of the wind turbine).

According to an embodiment, a model representing the recoverable power is used to define this angle. This power $P_{aero}$ can be written in equation form as follows:

$$P_{aero} = T_{aero} * \Omega_r$$

with:
$T_{aero}$ being the aerodynamic torque (rotational effort applied onto the rotor under the effect of the wind), and
$\Omega_r$ being the rotor velocity in rad/s.

Angle $\theta$, which allows $P_{aero}$ to be maximized during wind variation, is sought. The following stages are therefore carried out:

i generating an electrical torque setpoint value $T_e^{sp}$ as a function of a rotor velocity measurement;

ii generating a rotor velocity setpoint value $\Omega_r^{sp}$ as a function of a wind velocity measurement $V_w$ using mappings;

iii generating an aerodynamic torque setpoint value $T_{aero}^{sp}$ which follows the rotor velocity setpoint value; and iv determining a pitch position $\theta$ which achieves the aerodynamic torque while regulating the rotor velocity.

i—Generating an Electrical Torque Setpoint Value $T_e^{sp}$

Figure 5:
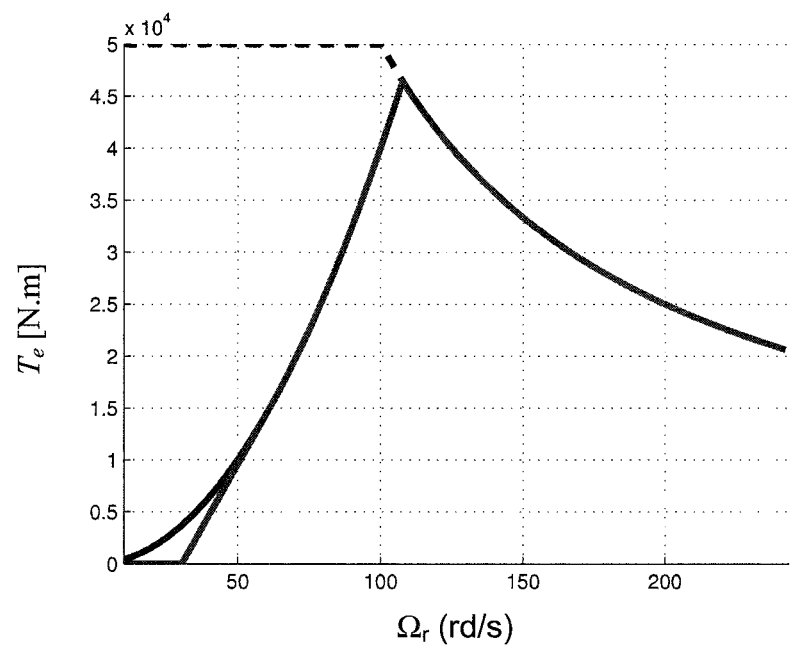
FIG. 5 illustrates an example of calibration of the electrical torque $T_e$ as a function of rotor velocity measurement $\Omega_r$.

This setpoint value is determined as a function of the rotor velocity measurement. This torque is determined in order to optimize the energy recovery under maximum power constraint, using mappings. An example of such a mapping is shown in FIG. 5, where $T_e$ is represented as a function of $\Omega_r$.

ii—Generating a Rotor Velocity Setpoint Value $\Omega_r^{sp}$

A rotor velocity setpoint value $\Omega_r^{sp}$ is first determined. This setpoint value is obtained using mappings that are a function of the wind velocity.

According to the invention, aerodynamic torque $T_{aero}$ is modelled by an equation representing the power of the wind contained in a cylinder, multiplied by a factor describing a fact that a wind turbine allows recovery of only part of this power. The aerodynamic torque is thus modeled by an equation which is a function of wind velocity $V_w$, of pitch $\theta$ and of rotor velocity $\Omega_r$. Such a model can be written as an equation as follows under stabilized conditions:

$$T_{aero} = 0.5 \rho \Pi R_b^3 c_q\left(\theta, \frac{R_b \Omega_r}{V_w}\right) V_w^2 \quad (1)$$

with:

$R_b$ being rotor radius;

p being air density; and $c_q$ being a mapping to be calibrated.

Figure 2:
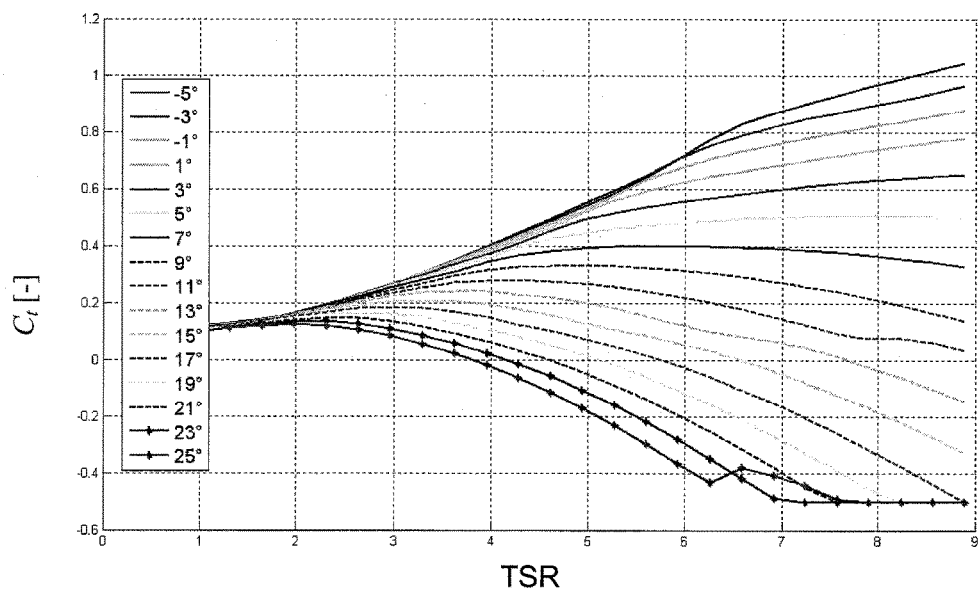
FIG. 2 illustrates a parameter $c_t$ mapping example.
Figure 3:
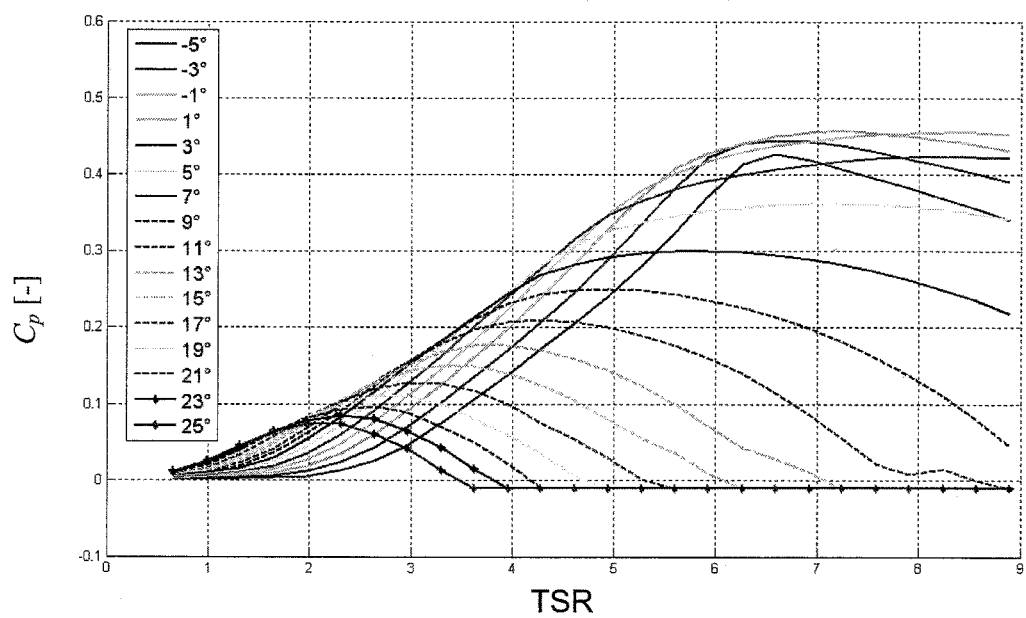
FIG. 3 illustrates a parameter $c_p$ mapping example.
Figure 4:
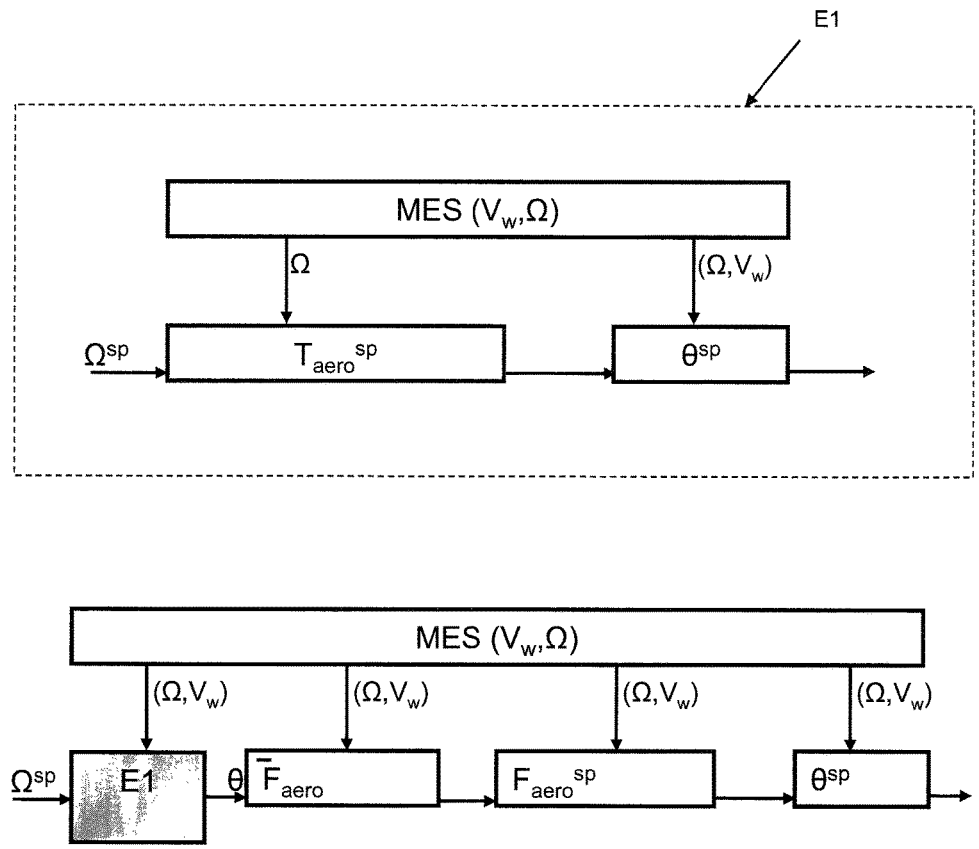
FIG. 4 shows the sequence of stages of the method according to the invention.

An example of parameter $c_q$ mapping is shown in FIG. 1. This mapping gives the value of parameter $c_q$ as a function of ratio $$\frac{R_b \Omega_r}{V_w}$$

for different pitches (a curve for each $\theta$). This type of mapping is well known. Ratio $$\frac{R_b \Omega_r}{V_w}$$

is denoted TSR in FIGS. 1 to 3.

Thus, in order to determine rotor velocity setpoint value $\Omega_r^{sp}$ as a function of the wind, the recovered aerodynamic power is optimized for each wind velocity.

$$\Omega_r^{sp} = \arg\left(\max_{\Omega_r} \left\{ 0.5 \rho \Pi R_b^3 c_q\left(\theta, \frac{R_b \Omega_r}{V_w}\right) V_w^2 * \Omega_r \right\}\right)$$

iii—Generating an Aerodynamic Torque Setpoint Value $T_{aero}^{sp}$

The goal is to generate an aerodynamic torque setpoint value $T_{aero}^{sp}$ allowing rotor velocity setpoint value $\Omega_r^{sp}$ to be achieved. Therefore, a model is used of the rotor dynamics expressed as an equation as follows:

$$J_r \frac{d\Omega_r}{dt} = T_{aero} - T_l(\Omega_r) - NT_e$$

with:

$J_r$ being rotor inertia;

$T_l(\Omega_r)$ being friction and load torque on the rotor (an order 2 polynomial is conventionally used);

N being a gear ratio between the rotor shaft and the electric machine shaft.

Thus, the control strategy that is used is a dynamic control strategy that anticipates the setpoint value variation and corrects it with two terms which are a proportional term and an integral term. The strategy is written in an equation form as follows:

$$T_{aero}^{sp} = T_l(\Omega_r) + NT_e(\Omega_r) + J_r \frac{d\Omega_r^{sp}}{dt} - k_p(\Omega_r - \Omega_r^{sp}) - k_i \int (\Omega_r - \Omega_r^{sp})$$

where kp and ki are two real parameters to be calibrated to guarantee convergence of the velocity to its setpoint value.

iv—Determining a Pitch Position $\theta$

From the torque setpoint value, an angle of inclination $\theta$ of the blades is determined which meets the aerodynamic torque $T_{aero}^{sp}$ request. The aerodynamic torque model represented as Equation 1 is thus used, with wind velocity measurement $V_w$, rotor velocity measurement $\Omega_r^{sp}$ and torque setpoint value $T_{aero}^{sp}$. Inverting the model expressed as an equation (by a Newtonian algorithm for example) allows obtaining a pitch setpoint value $\overline{\theta}$:

$$\overline{\theta} = \arg\left(\min_\theta \left(T_{aero}^{sp} - 0.5 \rho \Pi R_b^3 c_q\left(\theta, \frac{R_b \Omega_r}{V_w}\right) V_w^2\right)^2\right)$$

Thus, with this control law, convergence to the reference rotor velocity is guaranteed, which allows the recovered power to be maximized.

2—Determining the Aerodynamic Force Resulting from this Pitch Position

Another objective of the invention is to maximize the energy production while limiting extreme moments and fatigue of the mechanical structure. The orientation of the blades is therefore controlled so that setpoint value $\overline{\theta}$ of angle $\theta$ is modified to obtain a compromise between recovered power and structural fatigue. The impact is minimized by modifying the angle of inclination of the blades in such a way that the aerodynamic force applied onto the nacelle leads to a zero velocity at the top of the tower. The method notably is based on an equation representing a physical model of the aerodynamic force.

An aerodynamic force physical model is first selected for representing the aerodynamic force produced on the nacelle as a function of a wind velocity $V_w$, orientation angle $\theta$ and rotor velocity $\Omega_r$. Such an equation can be written as follows:

$$F_{aero} = 0.5 \rho \Pi R_b^2 c_t\left(\theta, \frac{R_b \Omega_r}{V_w}\right) V_w^2 \quad (2)$$

with:

$R_b$ being rotor radius;

p being air density; and $c_t$ being mapping to be calibrated.

An example of parameter $c_t$ mapping is shown in FIG. 2. This mapping gives the value of parameter $c_t$ as a function of ratio $$\frac{R_b \Omega_r}{V_w}$$

for different pitches (a curve for each θ). This type of mapping is well known.

This force is the one that will cause the nacelle to move and influences the dynamics of the tower (and of the platform is the wind turbine is positioned offshore on a platform). Using this function with pitch (θ) determined in the previous stage allows obtaining an aerodynamic force that is denoted $\overline{F}$.

3—Determining an Aerodynamic Force Setpoint Value $F_{aero}^{sp}$

In this stage, a setpoint value for the aerodynamic force produced on the nacelle when the blades are directed with the first angle is determined by decreasing the aerodynamic force determined in stage c) by a proportional term defined which decreases the velocity variations of the tower (and of the platform if the wind turbine is positioned offshore on a platform).

This setpoint value is intended to decrease the fatigue and extreme moments of the structure. It is desirable to modify the aerodynamic force to minimize impact on the structure and thus increase the life thereof. Therefore an attempt is made to decrease the velocity variations of the tower and of the platform. Thus, it is desirable to compensate for the aerodynamic force with terms which are proportional to the difference between the current platform and tower position and velocity values and their reference values. What is referred to as the reference value is the theoretical value which is sought which is zero tower and platform velocity with the tower and platform position being a function of $\overline{F}$ and of the force imposed by the sea ($F_{hydro}$).

The dynamics of the mechanical structure, that is of the tower (and of the platform if the wind turbine is positioned offshore) can be written in form of two coupled second-order systems:

$$\begin{cases} m_t \ddot{x}_t + k_t (\dot{x}_t - r\dot{x}_p) + c_t (x_t - rx_p) = F_{aero} \\ m_p \ddot{x}_p + k_p \dot{x}_p + c_p x_p - k_t (\dot{x}_t - r\dot{x}_p) - c_t (x_t - rx_p) = F_{hydro} \end{cases} \quad (3)$$

with:
$m_t$ and $m_p$ are the masses of the tower+nacelle assembly and of the platform respectively;
$k_t$ and $k_p$ are the structural dampings of the tower and of the platform;
$c_t$ and $c_p$ are the stiffnesses of the tower and of the platform; and
$F_{hydro}$ is the hydrodynamic force applied onto the structure.

An example of parameter $c_p$ mapping is shown in FIG. 3. This mapping gives the value of parameter $c_p$ as a function of ratio $$\frac{R_b \Omega_r}{V_w}$$

for different pitches (a curve for each θ). This type of mapping is well known.

The state of the system is defined by X and its reference state by Xref:

$$X = \begin{bmatrix} x_t \\ \dot{x}_t \\ x_p \\ \dot{x}_p \end{bmatrix} \text{ et } X_{ref} = \begin{bmatrix} \dfrac{\overline{F}}{c_t} + r \dfrac{(F_{hydro} - \overline{F})}{c_p} \\ 0 \\ \dfrac{(F_{hydro} + \overline{F})}{c_p} \\ 0 \end{bmatrix}$$

with r a parameter corresponding to the size ratio between the tower and the floating structure. This represents the position of the center of gravity.

Thus, the control strategy generates an aerodynamic force different from $\overline{F}$ which minimizes the fatigue and extreme moments of the structure. The following setpoint value is thus obtained:

$$F_{aero}^{sp} = \overline{F} - [k_1 k_2 k_3 k_4](X - X_{ref})$$

with k1, k2, k3 and k4 being calibration parameters to be determined. The pole placement technique or the LQR synthesis technique can be used.

4—Determining a Pitch Setpoint Value Allowing the Aerodynamic Force to be Achieved From the force setpoint value, a blade orientation is determined to meet this aerodynamic force request. The model represented in Equation 2 is thus used. Inverting the model (by a Newtonian algorithm for example) allows obtaining a pitch setpoint value. The pitch that minimizes the following optimization criterion is thus found:

$$\theta^{sp} = \arg\left( \min_\theta \left( F_{aero}^{sp} - 0.5 \rho \Pi R_b^2 c_t\left(\theta, \frac{R_b \Omega_r}{V_w}\right)(V_w)^2 \right)^2 \right)$$

In the case of an onshore wind turbine, there is no platform. In this case, the platform is stiff and therefore xp is constant at 0, as well as the hydrodynamic force. Furthermore, in the control structure, k3 and k4 are necessarily zero since there is no need for platform control.

5—Blade Orientation According to the Determined Pitch

In order to optimize the electrical power recovered by the wind turbine, the pales are directed at the angle of inclination calculated in the previous stage.

According to another embodiment, in order to improve the robustness with respect to the mechanical fatigue of the system, inversion of the aerodynamic force model represented by Equation 2 is not achieved directly from the wind velocity, but from the value to which a term proportional to the tower torsion $\dot{x}_t - \dot{x}_p$ is added (with $\dot{x}$ being the derivative of x with respect to time and x representing the position of the tower with respect to a reference). The pitch minimizing the following optimization criterion is thus found:

$$\theta^{sp} = \arg\left( \min_\theta \left( F_{aero}^{sp} - 0.5 \rho \Pi R_b^2 c_t\left(\theta, \frac{R_b \Omega_r}{V_w + g_f(\dot{x}_t - r\dot{x}_p)}\right)(V_w + g_f(\dot{x}_t - r\dot{x}_p))^2 \right)^2 \right)$$

with:
r being a parameter corresponding to the size ratio between the tower and the floating structure. This represents the position of the center of gravity;
$g_f$ being a monotonic non-decreasing function (typically a constant equal to the identity).

Thus, with this control law, convergence to the reference rotor velocity is guaranteed while having a second control on the fatigue of the system by anticipating the wind arriving onto the structure by a term proportional to the tower torsion.

Similarly, in order to improve the robustness with respect to the mechanical fatigue of the system, inversion of the aerodynamic torque model represented by Equation 1 is not achieved directly from the wind velocity, but from the value to which a term proportional to the tower torsion $\dot{x}_t - \dot{x}_p$ is added (with $\dot{x}$ being the derivative of x with respect to time and x representing the position of the tower with respect to a reference). The pitch minimizing the following optimization criterion is thus found:

$$\bar{\theta} = \arg\left(\min_\theta \left(T_{aero}^{sp} - 0.5\rho\Pi R_b^2 c_q\left(\theta, \frac{R_b\Omega_r}{V_w + g_t(\dot{x}_t - r\dot{x}_p)}\right)(V_w + g_t(\dot{x}_t - r\dot{x}_p))^2\right)^2\right)$$

with:
r being a parameter corresponding to the size ratio between the tower and the floating structure. This represents the position of the center of gravity;
$g_t$ being a monotonic non-decreasing function (typically a constant equal to the identity).

Thus, with this control law, convergence to the reference rotor velocity is guaranteed while having a control on the fatigue of the system by anticipating the wind arriving onto the structure by use of a term proportional to the tower torsion.

An example of a value for each parameter is given in the table hereafter:
$R_b$ 63 m
p 1,293 kg/m³.
Jr 4.3785e+007 kg/m2
N 93
$m_t$ 350000
$k_t$ 9. 3462e+004
$c_t$ 2.4958e+006
$M_p$ 21808000
$K_p$ 2.1179e+005
$C_p$ 3.2137e+005
K1 −3.1237e-006
K2 2.9282e-004
K3 −2.6337e-005
K4 0.1452
r 1

The invention claimed is:
1. A method of optimizing electrical power production of a horizontal axis wind turbine comprising a tower supporting a nacelle provided with a rotor to which blades are fastened with an angle of inclination of the blades being controlled, comprising:
 a) determining a first angle of inclination of the blades allowing recovered power to be maximized as a function of wind velocity by generating an electrical torque setpoint value as a function of a rotor measurement, generating a rotor velocity setpoint value as a function of a wind velocity measurement using mappings, generating an aerodynamic torque setpoint value which follows the rotor velocity setpoint value and the electrical torque setpoint value; and determining the first angle of inclination allowing achieving the aerodynamic torque setpoint value and providing regulation of a rotor velocity;
 b) providing a model of an aerodynamic force produced on the nacelle as a function of a wind velocity, of the angle of inclination of the blades and of a velocity of the rotor;
 c) determining the aerodynamic force produced on the nacelle when the blades are directed with the first angle of inclination;
 d) determining a setpoint value for the aerodynamic force produced on the nacelle when the blades are directed with the first angle of inclination by decreasing the aerodynamic force determined in c) by a term defined to minimize velocity variations at a top of the tower to lessen structural fatigue of the tower for electrical power generation during wind speed variation;
 e) determining a second angle of inclination of the blades allowing obtaining the aerodynamic force by inverting the model of the aerodynamic force while using a wind velocity measurement, a rotor velocity measurement and the setpoint value of the aerodynamic force; and
 f) directing the blades to the second angle to provide maximum power generation during the wind speed variation while minimizing the velocity variations at the top of the tower.

2. The method as claimed in claim 1, wherein the term defined to decrease velocity variations at the top of the tower is proportional to a difference between a current tower position and velocity values and a reference tower position and velocity values with a reference position value depending on the aerodynamic force determined in c), and a zero reference velocity value.

3. The method as claimed in claim 2, wherein the model of aerodynamic force depending on wind velocity Vw, on the angle of inclination θ of the blades and on the velocity of the rotor $\Omega r$ is expressed as an equation:

$$F_{aero} = 0.5\rho\Pi R_b^2 c_t\left(\theta, \frac{R_b\Omega_r}{V_w}\right)V_w^2$$

with:
Rb being rotor radius;
p being air density; and
ct being a mapping parameter.

4. The method as claimed in claim 3, wherein a term proportional to torsion of the tower is added to the term defined to decrease velocity variations at the top of the tower.

5. The method as claimed in claim 4, wherein the first angle of inclination of the blades allowing recovered power to be optimized is determined by:
 a) providing a model of aerodynamic torque produced on the nacelle in an equation which is a function of a wind velocity Vw, of the angle of inclination of the blades and of velocity $\Omega r$ of the rotor;
 b) determining the aerodynamic torque setpoint value from the model of the aerodynamic torque; and
 c) determining the first angle of inclination of the blades for obtaining the aerodynamic torque setpoint value by inverting the model of the aerodynamic torque while using a wind velocity measurement, a rotor velocity measurement and the aerodynamic torque setpoint value.

6. The method as claimed in claim 5, wherein the model of the aerodynamic torque is expressed as an equation:

$$T_{aero} = 0.5\rho \Pi R_b^3 c_q\left(\theta, \frac{R_b\Omega_r}{V_w}\right)V_w^2$$

with:
Rb being rotor radius;
p being air density;
cq being a mapping parameter;
Vw being wind velocity; and
Ωr being rotor velocity.

7. The method as claimed in claim 3, wherein the first angle of inclination of the blades allowing recovered power to be optimized is determined by:
   a) providing a model of aerodynamic torque produced on the nacelle in an equation which is a function of a wind velocity Vw, of the angle of inclination of the blades and of velocity Ωr of the rotor;
   b) determining the aerodynamic torque setpoint value from the model of the aerodynamic torque; and
   c) determining the first angle of inclination of the blades for obtaining the aerodynamic torque setpoint value by inverting the model of the aerodynamic torque while using a wind velocity measurement, a rotor velocity measurement and the aerodynamic torque setpoint value.

8. The method as claimed in claim 7, wherein the model of the aerodynamic torque is expressed as an equation:

$$T_{aero} = 0.5\rho \Pi R_b^3 c_q\left(\theta, \frac{R_b\Omega_r}{V_w}\right)V_w^2$$

with:
Rb being rotor radius;
p being air density;
cq being a mapping parameter;
Vw being wind velocity; and
Ωr being rotor velocity.

9. The method as claimed in claim 2, wherein the first angle of inclination of the blades allowing recovered power to be optimized is determined by:
   a) providing a model of aerodynamic torque produced on the nacelle in an equation which is a function of a wind velocity Vw, of the angle of inclination of the blades and of velocity Ωr of the rotor;
   b) determining the aerodynamic torque setpoint value from the model of the aerodynamic torque; and
   c) determining the first angle of inclination of the blades for obtaining the aerodynamic torque setpoint value by inverting the model of the aerodynamic torque while using a wind velocity measurement, a rotor velocity measurement and the aerodynamic torque setpoint value.

10. The method as claimed in claim 9, wherein the model of the aerodynamic torque is expressed as an equation:

$$T_{aero} = 0.5\rho \Pi R_b^3 c_q\left(\theta, \frac{R_b\Omega_r}{V_w}\right)V_w^2$$

with:
Rb being rotor radius;
p being air density;
cq being a mapping parameter;
Vw being wind velocity; and
Ωr being rotor velocity.

11. The method as claimed in claim 10, wherein a term proportional to tower torsion is added to the term defined to decrease wind velocity variations at the top of the tower.

12. The method as claimed in claim 1, wherein the model of aerodynamic force depending on wind velocity Vw, on the angle of inclination θ of the blades and on the velocity of the rotor Ωr, is expressed as an equation:

$$F_{aero} = 0.5\rho \Pi R_b^2 c_t\left(\theta, \frac{R_b\Omega_r}{V_w}\right)V_w^2$$

with:
Rb being rotor radius;
p being air density; and
ct being a mapping parameter.

13. The method as claimed in claim 12, wherein a term proportional to torsion of the tower is added to the term defined to decrease velocity variations at the top of the tower.

14. The method as claimed in claim 13, wherein the first angle of inclination of the blades allowing recovered power to be optimized is determined by:
   a) providing a model of an aerodynamic torque produced on the nacelle in an equation which is a function of a wind velocity Vw, of the angle of inclination of the blades and of velocity Ωr of the rotor;
   b) determining the aerodynamic torque setpoint value from the model of the aerodynamic torque; and
   c) determining the first angle of inclination of the blades for obtaining the aerodynamic torque setpoint value by inverting the model of the aerodynamic torque while using a wind velocity measurement, a rotor velocity measurement and the aerodynamic torque setpoint value.

15. The method as claimed in claim 14, wherein the model of the aerodynamic torque is expressed as an equation:

$$T_{aero} = 0.5\rho \Pi R_b^3 c_q\left(\theta, \frac{R_b\Omega_r}{V_w}\right)V_w^2$$

with:
Rb being rotor radius;
p being air density;
cq being a mapping parameter;
Vw being wind velocity; and
Ωr being rotor velocity.

16. The method as claimed in claim 12, wherein the first angle of inclination of the blades allowing recovered power to be optimized is determined by:
   a) providing a model of aerodynamic torque produced on the nacelle in an equation which is a function of a wind velocity Vw, of the angle of inclination of the blades and of velocity Ωr of the rotor;
   b) determining the aerodynamic torque setpoint value from the model of the aerodynamic torque; and
   c) determining the first angle of inclination of the blades for obtaining the aerodynamic torque setpoint value by inverting the model of the aerodynamic torque while using a wind velocity measurement, a rotor velocity measurement and the aerodynamic torque setpoint value.

17. The method as claimed in claim 16, wherein the model of the aerodynamic torque is expressed as an equation:

$$T_{aero} = 0.5\rho \Pi R_b^3 c_q\left(\theta, \frac{R_b \Omega_r}{V_w}\right) V_w^2$$

with:
Rb being rotor radius;
p being air density;
cq being a mapping parameter;
Vw being wind velocity; and
Ωr being rotor velocity.

* * * * *